Jan. 26, 1926.

M. CARRASCO-SÁNCHEZ 1,570,727

MECHANICAL MOVEMENT

Filed Sept. 4, 1925

Inventor
MANUEL CARRASCO-SÁNCHEZ
Attorney

Patented Jan. 26, 1926.

1,570,727

UNITED STATES PATENT OFFICE.

MANUEL CARRASCO-SÁNCHEZ, OF WASHINGTON, DISTRICT OF COLUMBIA.

MECHANICAL MOVEMENT.

Application filed September 4, 1925. Serial No. 54,572.

*To all whom it may concern:*

Be it known that I, MANUEL CARRASCO-SÁNCHEZ, a subject of the King of Spain, residing at Washington, District of Columbia, have invented certain new and useful Improvements in Mechanical Movements, of which the following is a specification.

The present invention relates to means for transforming the reciprocatory motion of a prime mover, as a rack or similar device, into rotary motion and in either of opposite directions. It is specifically useful in connection with a driving and a driven shaft that are arranged in angular relation.

The object is to provide a novel and effective mechanism of this character, in which one or more prime movers may be utilized, and in which the shafts can be disposed at different angles. It thus is useful in connection with a multiple cylinder engine for automobiles, aeroplanes and the like.

In the accompanying drawings:—

Figure 1:
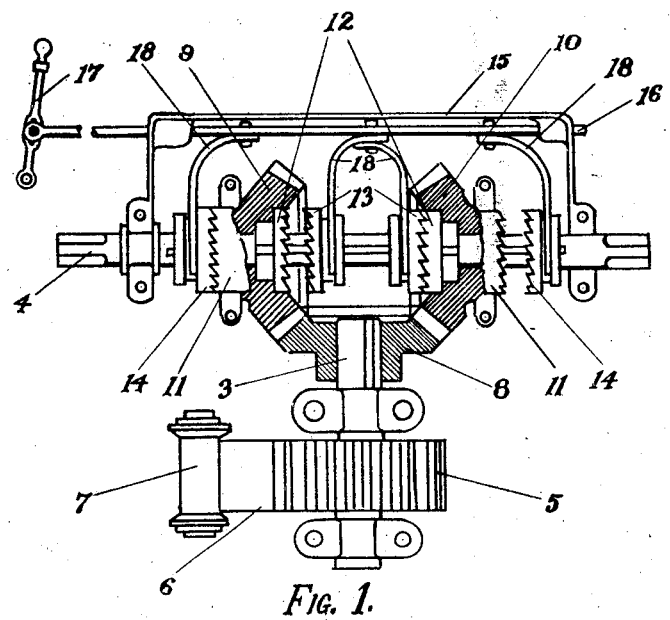
Figure 2:
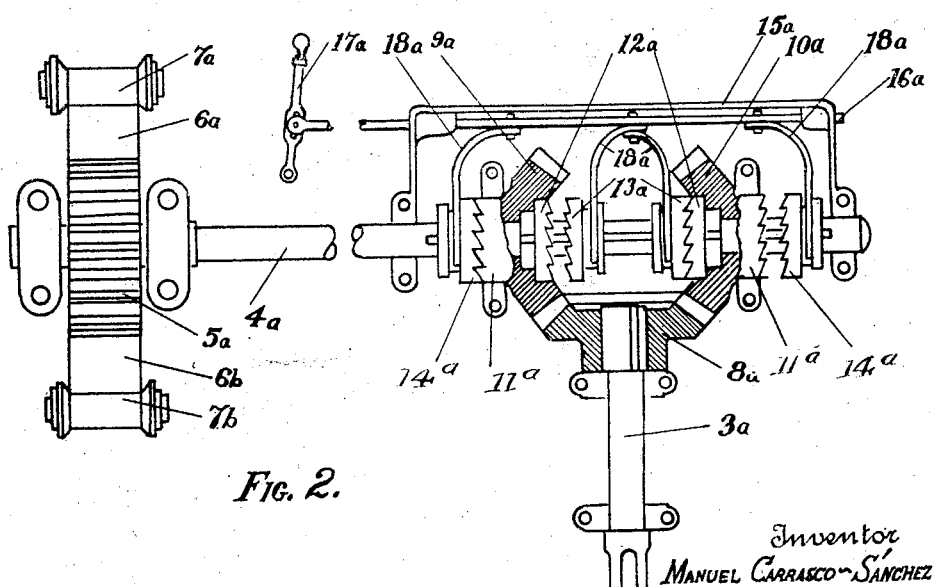

Figure 1 is a view partially in elevation and partially in section of one embodiment of the invention, Figure 2 is a view similar to Figure 1, but showing a slightly modified form of construction.

In the embodiment disclosed in Figure 1, a driving shaft is shown at 3, and a driven shaft at 4, these shafts being shown at an angle of 90 degrees, though their angular relation may be varied. The driving shaft is shown as having a gear wheel 5 engaged with a prime mover in the form of a rack 6, having a bearing roller 7 in opposition to the gear 5. The driving shaft 3 is also provided with a bevel gear 8.

Loosely journaled on the driven shaft 4 and on opposite sides of the gear 8, are bevel gears 9 and 10, that are in mesh with the diametrically opposite portions of the driving gear 8. Each of the gears 9 and 10 has a set of ratchet teeth 11 on one side and a second set of reversely disposed ratchet teeth 12 on the other side. Feathered to the shaft 4 and located between the bevel gears 9 and 10 are clutch elements 13 having sets of teeth that are movable into and out of coaction with the teeth 12. On the outer sides of the gears 9 and 10 are other clutch elements 14 having reversely disposed teeth that are movable into and out of interfitting relation with the clutch teeth 11. These elements 14 are also feathered to the shaft 4. A suitable supporting frame 15 has slidably mounted therein an actuating bar 16 that may be moved by any suitable means, as for example, a hand lever 17. Secured to this bar are spring arms 18 that are engaged with the respective clutch elements 13 and 14.

It will be obvious that by swinging the lever 17 in one direction or the other, one of the sets of clutch elements will be moved into coacting relation with the teeth on the gears 9 and 10, while the other set will be disengaged. On the other hand when the lever is thrown in the opposite direction, the other set of clutch elements will be moved into operation while the first set will be disengaged. There is also an intermediate position where all sets will be free.

It will thus be evident that if the rack or other prime mover 6 is reciprocated and the gear 5 is turned in one direction or the other the driving shaft 3 will be correspondingly turned, as will also the gear wheel 8. The consequence is that the two gears 9 and 10 are alternately moved in opposite directions, and when one set of clutch elements 13—14 is in operation, as shown in Figure 1, these gear wheels 9 and 10 will alternately transmit motion in one direction to the driven shaft 4, thereby continuously rotating it in said direction. If the lever is shifted, however, to its opposite extreme position, then the set in action will be disengaged, while the other set will be thrown into operation and the shaft 4 will be continuously rotated in the opposite direction.

The mechanism may be exactly reversed, so that the shaft 4 becomes the driving shaft and the shaft 3 the driven shaft. Thus, as shown in Figure 2, the shaft 3ª is the driven shaft, and the shaft 4ª is the driving shaft. This latter shaft is provided with a gear 5ª engaged with one or more racks or other prime movers 6ª having suitable bearing rollers 7ª. The shaft 3ª has a bevel gear 8ª fixed thereto, and is in mesh with two loose gears 9ª and 10ª rotatably mounted on the shaft 4ª. The gears have outer clutch elements 11ª and inner clutch elements 12ª. Coacting with the latter are clutch elements 13ª feathered on the shaft 4ª, and reversely disposed outer clutch elements 14ª cooperate with the outer clutch elements 11ª. The frame 15ª has an operating bar 16ª slidable therein, and operated by a lever 17ª. Mounted on the bar 16ª are spring arms 18ª engaged with the clutch elements 13ª and 14ª to operate them. Obviously this structure operates like the first-described, except that an alternate rotation is imparted to the shaft 4ª, and the shaft 3ª becomes a driven shaft that is continuously rotated in one direction or the other according to the set of clutch elements that is thrown into operation.

The mechanisms can be utilized with one or more driving elements, for example two racks 7ª and 7ᵇ illustrated in Figure 2.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

What I claim, is:

1. In motion transformation mechanism, the combination with angularly disposed driving and driven shafts, of a gear on one of said shafts, a pair of opposite gears journaled on the other shaft and in operative association with the first-mentioned gear, a set of reverse clutch mechanisms for each of said opposite gears, and means for moving one or the other of the sets of the two gears into and out of coaction to cause the gears and shaft to rotate together in either of opposite directions.

2. In motion transformation mechanism, the combination with angularly disposed shafts, of a bevel gear on one of the shafts, oppositely set beveled gears loose on the other shaft and meshing with the first gear, said opposite gears each having reversely disposed clutch elements, reversely disposed clutch elements on the said other shaft movable into and out of coacting relation with the elements of the gears, and means for causing one set of corresponding elements of the shaft to coact with those of the gears and while the other set is inactive and vice versa to cause the gears and shaft to rotate together in either of opposite directions.

3. In motion transformation mechanism, the combination with a driving shaft, of a driven shaft disposed in angular relation to the driving shaft, a gear fixed to the driven shaft, gears loosely journaled on the driving shaft and meshing with the fixed gear, means for turning the driving shaft alternately in opposite directions, and means for automatically clutching the loose gears alternately to the driving shaft as its direction of rotation is reversed to thereby cause the fixed gear and the driven shaft to be rotated in the same direction.

4. In motion transformation mechanism, the combination with a driving shaft, of a driven shaft disposed in angular relation to the driving shaft, a gear fixed to the driven shaft, gears loosely journaled on the driving shaft and meshing with the fixed gear, means for turning the driving shaft alternately in opposite directions, means for automatically clutching the loose gears alternately to the driving shaft as its direction of rotation is reversed to thereby cause the fixed gear and the driven shaft to be rotated in the same direction, and means for reversing the alternate clutching action between the driving shaft and the loose gears to reverse their direction of rotation and thereby cause the fixed gear and driven shaft to be rotated in the opposite direction.

In testimony whereof, I affix my signature.

MANUEL CARRASCO-SÁNCHEZ.